(12) United States Patent
Wilcox

(10) Patent No.: US 9,935,518 B2
(45) Date of Patent: Apr. 3, 2018

(54) SHIM FREE POTHEAD HOUSING CONNECTION TO MOTOR OF ELECTRICAL SUBMERSIBLE WELL PUMP

(71) Applicant: Baker Hughes Incorporated, Houston, TX (US)

(72) Inventor: Spencer L. Wilcox, Claremore, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 308 days.

(21) Appl. No.: 14/825,247

(22) Filed: Aug. 13, 2015

(65) Prior Publication Data

US 2016/0047383 A1    Feb. 18, 2016

Related U.S. Application Data

(60) Provisional application No. 62/037,398, filed on Aug. 14, 2014.

(51) Int. Cl.
*H02K 5/132* (2006.01)
*E21B 43/12* (2006.01)
*E21B 17/02* (2006.01)
*F04D 13/10* (2006.01)

(52) U.S. Cl.
CPC ........... *H02K 5/132* (2013.01); *E21B 17/028* (2013.01); *E21B 43/128* (2013.01); *F04D 13/10* (2013.01)

(58) Field of Classification Search
CPC .................................................. H02K 5/132
USPC ........................................................ 439/625
See application file for complete search history.

(56) References Cited

U.S. PATENT DOCUMENTS

| 5,700,161 | A | 12/1997 | Plummer et al. |
| 6,361,342 | B1 | 3/2002 | Cox |
| 6,443,780 | B2 | 9/2002 | Wilbourn et al. |
| 6,676,447 | B1 | 1/2004 | Knox |
| 6,780,037 | B1 | 8/2004 | Parmeter et al. |
| 7,325,596 | B2 * | 2/2008 | Ebner ................... E21B 17/028 166/105 |
| 7,575,458 | B2 * | 8/2009 | Parmeter .............. H01R 13/521 439/271 |
| 7,644,962 | B2 * | 1/2010 | Crouse .................. F16L 23/032 285/405 |

(Continued)

OTHER PUBLICATIONS

U.S. Appl. No. 14/598,400, filed Jan. 16, 2015, entitled "Boltless Electrical Connector for Submersible Well Pump".

*Primary Examiner* — Alexander Gilman
(74) *Attorney, Agent, or Firm* — Bracewell LLP; James E. Bradley

(57) ABSTRACT

A submersible well pump assembly has an electrical motor connected with the pump. An electrical receptacle on the motor has a base into which a central bore and first and second threaded holes on opposite sides of the bore extend, the threaded holes having nominal major diameters that are the same. A motor lead extends to the motor and has an electrical connector that mates with the receptacle. The electrical connector has a flange containing first and second bolt holes, the second bolt hole having a diameter nearly the same as the diameter of the second threaded hole. The first bolt hole has a diameter that is larger than the diameter of the second bolt hole and also larger than the diameter of the first threaded hole. Bolts extend through the bolt holes into threaded engagement with the threaded holes.

13 Claims, 4 Drawing Sheets

(56) References Cited

U.S. PATENT DOCUMENTS

| | | | | |
|---|---|---|---|---|
| 7,666,013 B1* | 2/2010 | Kopecky | ................ | F04D 13/10 |
| | | | | 417/423.3 |
| 7,789,689 B2* | 9/2010 | Frey | .................... | H01R 13/523 |
| | | | | 439/275 |
| 7,942,696 B2* | 5/2011 | Watson | ................ | E21B 17/023 |
| | | | | 439/589 |
| 8,491,282 B2* | 7/2013 | Shaver | .................... | F04B 47/06 |
| | | | | 277/608 |
| 8,512,074 B2* | 8/2013 | Frey | .................... | H01R 13/523 |
| | | | | 439/279 |
| 9,673,558 B2* | 6/2017 | Frey | .................... | H01R 13/521 |
| 9,709,043 B2* | 7/2017 | Gilmore | ................ | F04B 17/03 |
| 2002/0013093 A1* | 1/2002 | Wilbourn | ........... | H01R 13/5202 |
| | | | | 439/625 |
| 2004/0058575 A1* | 3/2004 | Nicholson | ............ | H01R 13/533 |
| | | | | 439/201 |
| 2004/0175226 A1* | 9/2004 | Katorgin | ............... | F16L 27/053 |
| | | | | 403/122 |
| 2012/0052721 A1* | 3/2012 | Watson | ................ | E21B 17/025 |
| | | | | 439/519 |
| 2012/0270006 A1* | 10/2012 | McMillan | ............. | F01D 25/243 |
| | | | | 428/77 |
| 2013/0199062 A1* | 8/2013 | Reid | ....................... | F16L 3/127 |
| | | | | 40/299.01 |
| 2014/0093327 A1* | 4/2014 | Bowers | .................. | F16B 39/24 |
| | | | | 411/111 |

* cited by examiner

SHIM FREE POTHEAD HOUSING CONNECTION TO MOTOR OF ELECTRICAL SUBMERSIBLE WELL PUMP

FIELD OF THE DISCLOSURE

This invention relates to electrical submersible well pumps and particularly to a connection of the power cable to the motor that does not require shims for the fasteners.

BACKGROUND

Electrical submersible pumps (ESP) are commonly used to pump fluids from hydrocarbon producing wells. A typical ESP includes a pump, which is often a centrifugal type, driven by an electrical motor. A power cord extends torn a wellhead down the well to the motor for supplying power to the motor. The power cord may have a motor lead on its lower end with an electrical connector that plugs into engagement with an electrical receptacle on the motor. The engagement of the electrical connector and the electrical receptacle must be able to withstand high pressures and temperatures over a period of time that may be years.

One type of electrical receptacle has a base with a central cavity extending into the motor for the location of motor electrical terminals. Threaded holes are located on opposite sides of the cavity. The electrical connector has a housing with a central cavity containing motor lead electrical terminals that stab into engagement with the motor electrical terminals. The housing of the electrical connector has a flange with bolt holes that align with the threaded holes in the base of the electrical receptacle. Bolts insert through the bolt holes and engage the threaded holes to secure the electrical connector to the electrical receptacle.

While this arrangement works well, due to tolerances, some times the bolt holes do not precisely align with the threaded holes. To account for a tolerance stack up, both bolt holes in the flange are made significantly larger than the threaded holes. Alignment shims must be employed to properly align the bolts with the threaded holes. The alignment shims are placed on the back of the electrical connector to centralize the bolts with the threaded holes and accommodate for lateral movement of the connector housing relative to the connector receptacle. During running in of the ESP, the motor may slide against different parts of the well casing, and lateral loads on the electrical connector can result, causing sliding movement of the electrical connector on the receptacle due to the large diameter bolt holes. Shifting of the electrical connector on the receptacle can possibly result in a loss of the sealing engagement.

The alignment shims are comparable in size to a ⅜ inch washer and may be dropped or lost during connection of the motor lead with the motor while the ESP is suspended above a rig floor. Also, the alignment shims may be inadvertently omitted. As a result, the bolts could bottom out in the threaded holes and not transmit the proper preload forces to the electrical connector.

SUMMARY

A submersible well pump assembly includes an electrical motor operatively connected with a pump for driving the pump. An electrical receptacle on the motor has a base into which a central bore and first and second threaded holes on opposite sides of the bore extend. A motor lead extends to the motor and has an electrical connector that mates with the receptacle. The electrical connector has a plurality of electrical conductors, each having a motor lead terminal for electrically connecting with a mating motor terminal in the motor. The electrical connector has a flange containing first and second bolt holes, the first bolt hole having a larger cross sectional area than a cross sectional area of the second bolt hole and also larger than the cross sectional area of the first threaded hole. A first bolt extends through the first bolt hole into the first threaded hole, and a second bolt extends through the second bolt hole into the second threaded hole to secure the electrical connector to the electrical receptacle.

In the embodiment shown, the second bolt hole has a cross sectional area nominally the same as a cross sectional area of the second threaded hole. More specifically, the second bolt hole has a diameter that is nominally or nearly the same as a major diameter of the second threaded hole. Preferably, the bolts have threaded sections with major diameters that are nominally the same.

Preferably, each of the bolt holes is circular when viewed in transverse cross section. The second bolt hole has a diameter that may be in the range from 80 to 90 percent a diameter of the first bolt hole.

In the preferred embodiment, each of the bolt holes has a circular cross section with an axis, and each of the threaded holes has a circular cross section with as axis. A nominal distance between the axes of the bolt, holes is the same as a nominal distance between the axes of the threaded holes. In the event tolerances cause an actual distance between the axes of the bolt holes to differ from an actual distance between the axes of the threaded holes, the bolt within the first bolt hole will be off center from the axis of the first bolt hole.

The bolt within the second bolt hole has a threaded section with a major diameter that is nominally the same and slightly less than a diameter of the second bolt hole. The bolt within the first bolt hole has a threaded section with a major diameter that is significantly less than a diameter of the first bolt hole.

BRIEF DESCRIPTION OF THE DRAWINGS

So that the manner in which the features and advantages of the invention, as well as others which will become apparent may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

Figure 1:
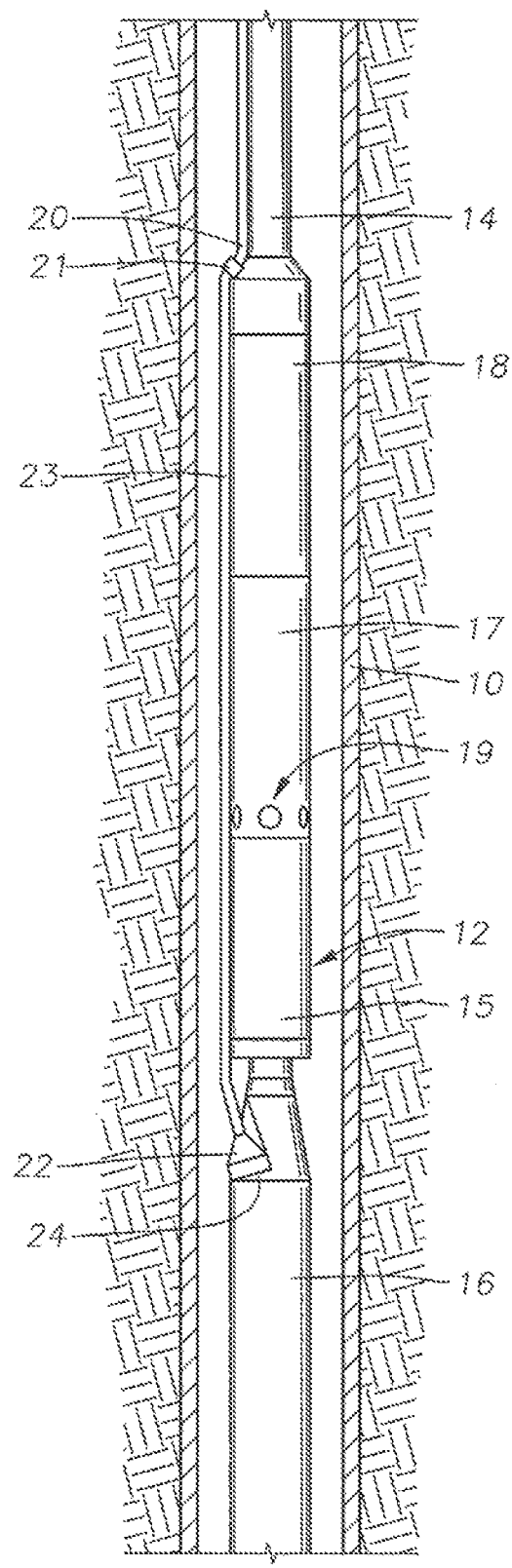
FIG. 1 is a side view of an electrical submersible pump assembly according to an embodiment of the present invention shown disposed in a well.

FIG. 1 is an elevational section view of well 10 having electrical submersible pumping system (ESP) 12 disposed therein. ESP 12 includes an electric motor 16, a seal/equalizer section 15, an optional separator 17, and a pump 18. Pump 18 may comprise a centrifugal pump or a progressing cavity pump, for example. Fluid inlets 19 are shown provided on separator 17 for providing a passage for receiving fluid into pump 18. Production tubing 14 is coupled to the discharge of pomp 18 for conveying pressurized production fluid from the ESP 12 to surface.

Cable 20 extends downhole, terminating in a splice or connector 21 that electrically couples cable 20 to a motor lead 23. Motor lead 23, on its lower terminal end, connects to an electrical connector 22, also referred to as a pothead connector, that electrically connects and secures motor lead 23 to motor head 24 of electric motor 16. In another embodiment, cable 20 can extend all the way from the surface to pothead connector 22. Thereby eliminating the need for cable connector 21.

Figure 2:
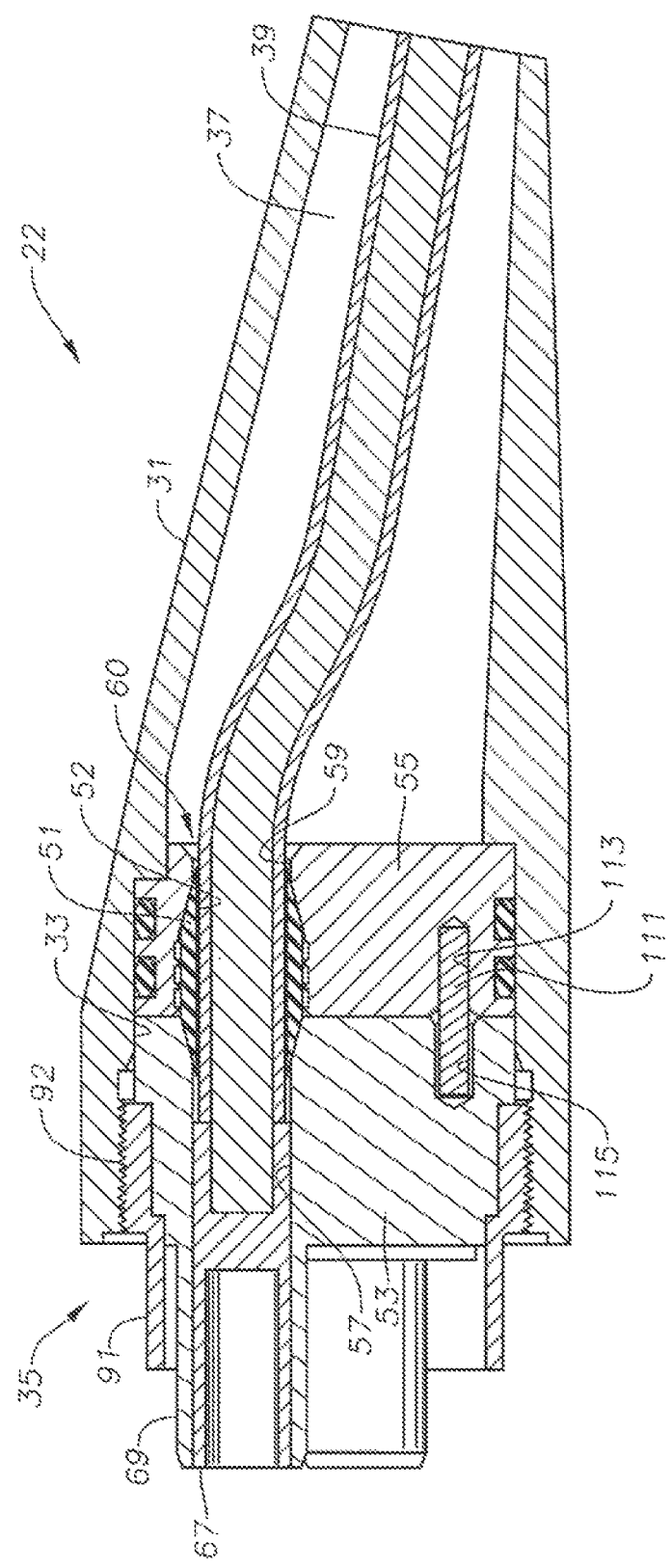
FIG. 2 is cross-sectional view of a pothead assembly that connects a power cable to the motor of the pomp assembly of FIG. 1.
Figure 3:
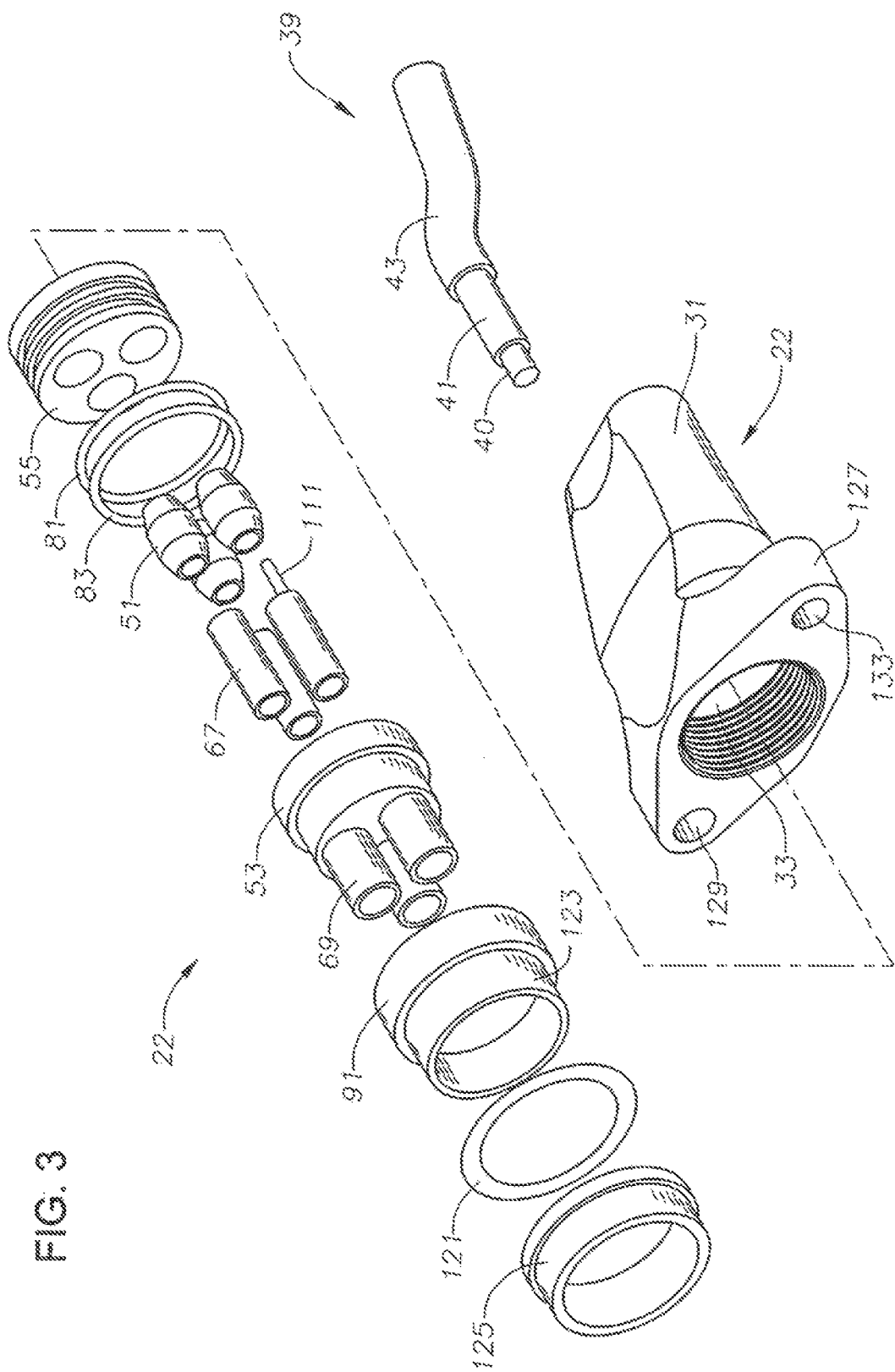
FIG. 3 is an exploded perspective view of the pothead assembly of FIG. 2.

FIG. 2 is a longitudinal cross sectional view and FIG. 3 an exploded view depicting one example of pothead connector 22. FIGS. 2 and 3 are more thoroughly described in U.S. Pat. No. 8,512,074. Other types of pothead connectors are also feasible. In the embodiment shown, pothead connector 22 comprises a housing 31 adapted to connect pothead connector 22 to the motor head 24. As shown, formed into an end of the pothead housing 31 is a cylindrical cavity 33 for containing a compression seal assembly 35. One or more passageways/conduits 37 extend from an opposite end of the pothead housing 31 and into the cavity 33. The conduits 37 receive a plurality of electrical conductors 39, one for each phase of the motor 16. For clarity, it should be noted that FIGS. 2 and 3 show only a single electrical conductor 39. The typical motor 16 for an ESP 12 is a three-phase motor having three conductors 39.

As shown in FIG. 3, each conductor 39 provides an electrical pathway from surface equipment (not shown) to the electric motor 16 and includes three wires 40, each separately insulated by its own insulating layer 41. A protective barrier of thin-walled tubing 43 surrounds each insulating layer 41 and functions to protect the insulating layer 41 and wire 40 from harsh elements within well bore 10.

Referring to FIG. 2, compression seal assembly 35 includes elastomeric boot seals 51 for sealing along an outer diameter of each of the Insulated conductors 39. Each boot seal 51 includes a through bore 52 dimensioned to sealingly accommodate the insulating layer 41 therethrough. Compression seal assembly 35 also includes a pair of lower and upper insulators 53, 55 positioned to compressively house and contain the boot seals 51. Lower and upper insulators 53, 55 each have generally cylindrical portions and are set generally coaxial within the connector 22. Bores 57 in the lower insulator 53 register with bores 59 in the upper insulator 55 to define cavities 60. Boot seals 51 are disposed in the annular space between the conductors 39 and walls of the cavities 60. A cylindrical extension 69 for each conductor 39 projects from an end of the lower insulator 53 opposite the upper insulator 55 in a direction substantially parallel with an axis of the lower insulator 53. An electrical terminal 67 for each conductor 39 is located in one of the extensions 69. Seals 81,83 seal the outer diameter of upper insulator 55 to the inner wall of pothead housing 31.

An annular retaining nut 91 is threaded on an outer surface, threadingly connecting nut 91 to corresponding threads 92 formed on an inner circumference of the cavity 33. Tightening nut 91 urges an end of the nut 91 against a ledge shown radially protruding from an outer surface of the lower insulator 53. Continued threaded engagement between nut 91 and threads 92 to urge nut 91 against the ledge in turn urges the lower and upper insulators 53, 55 into the cavity 33 to retain. The lower and upper insulators 53, 55, and thus, sealingly retain boot seals 51. An alignment pin 111 extends between a hole 113 in upper insulator 55 and a hole 115 in lower insulator 53 to align the passages for each conductor 39.

Referring to FIG. 3, nut 91 has a cylindrical extension 123 that protrudes from pothead housing 31. A lead washer 121 fits around nut extension 123. A retaining nut boot seal 125 fits over nut extension 123 below washer 121.

Figure 4:
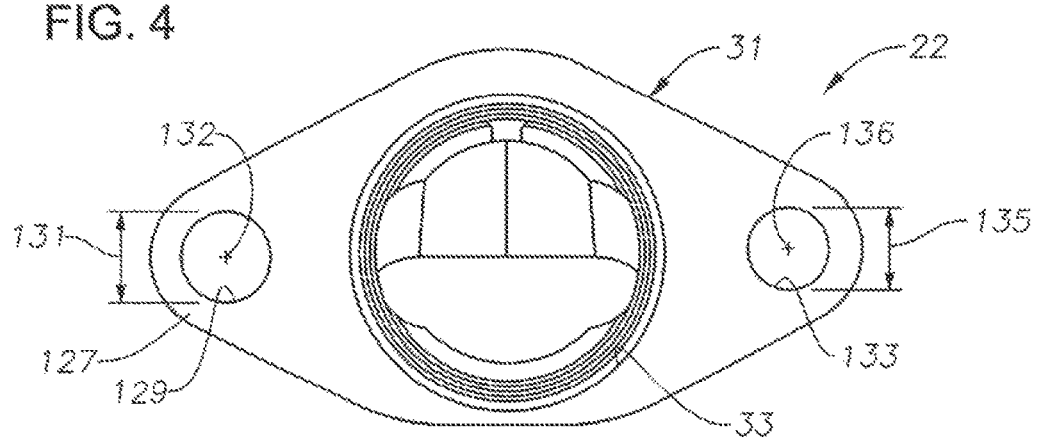
FIG. 4 is a bottom view of the housing of the pothead assembly of FIG. 2, with the inner components of the pothead connector removed.
Figure 5:
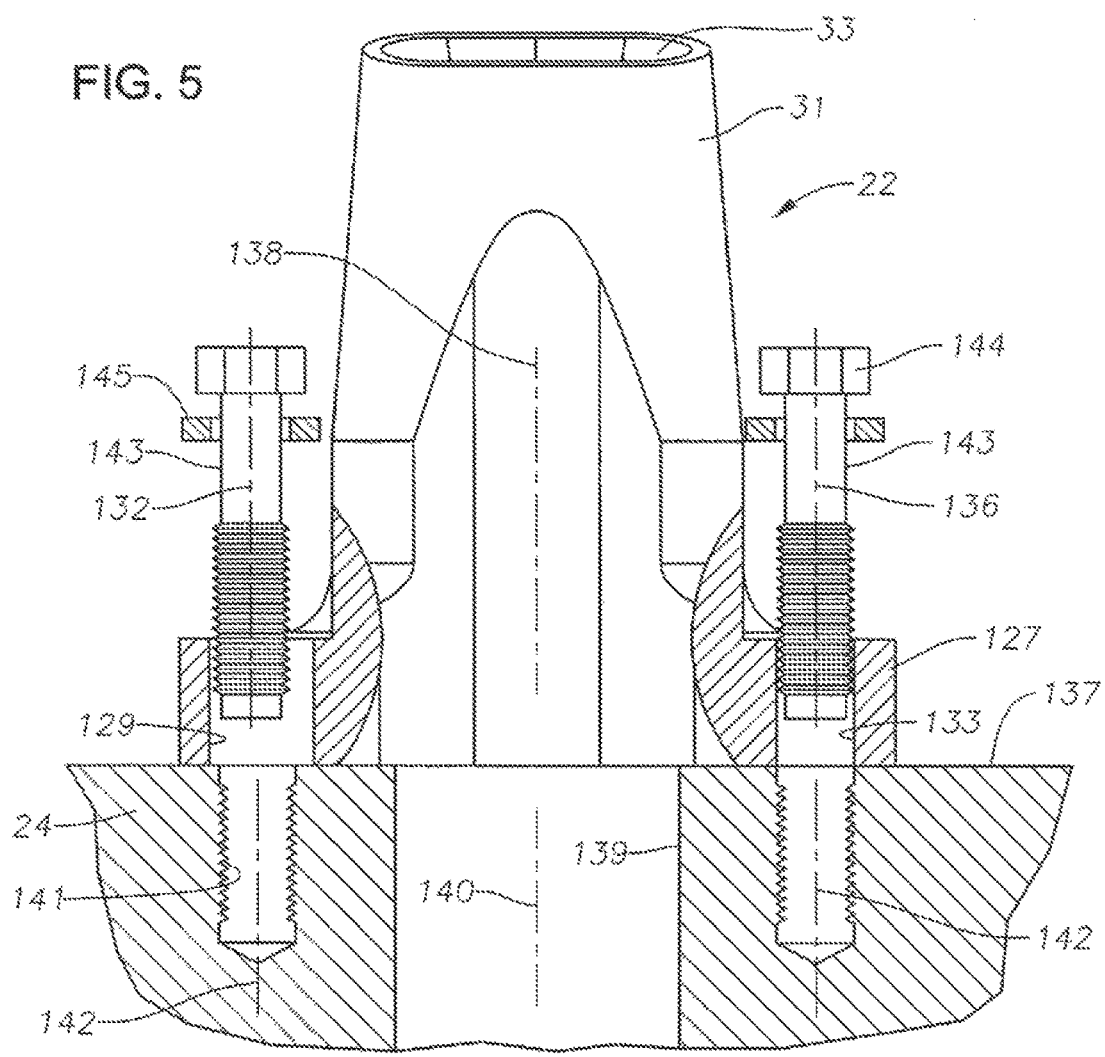
FIG. 5 side view of the pothead housing of FIG. 2, in abutment with the motor head, both partially sectioned, and with the inner components of the pothead connector and the motor head removed.

Referring to FIGS. 4 and 5, pothead housing 31 has an external flange 127 on its lower end. In the bottom view of FIG. 4, flange 127 appears generally diamond-shaped. Flange 127 has a cylindrical first bolt hole 129, referred to herein as the larger bolt hole, extending axially through it on one side of central cavity 33. Larger bolt hole 129 has a diameter 131 and extends along an axis 132. A cylindrical second or smaller bolt hole 133 extends through flange 127 on an opposite side of cavity 33. Smaller bolt hole 133 has an axis 136 and a smaller diameter 135 than larger bolt hole 129. Axes 132 and 136 are parallel with pothead housing cavity axis 138.

Referring to FIG. 5, motor head 24 has a receptacle surface or base 137 on which flange 127 abuts when connector 22 is secured to motor head 24. Receptacle surface 137 is typically flat and at an acute angle relative to the axis of motor 16 (FIG. 1). A central bore 139 with an axis 140 extends inward from receptacle surface 137 for the location of terminals of motor wires (not shown). Threaded holes 141 are located on opposite sides of receptacle surface 137, each having an axis 142. Threaded holes 141 may have the same nominal major diameter, and that major diameter may be the substantially the same as but slightly smaller than pothead housing smaller bolt hole 133. The major diameter of threaded holes 141 is measured at the roots of the threads.

A pair of fasteners or holts 143 extend through flange bolt holes 129 and 133 and into threaded engagement with threaded holes 141. Bolts 143 have threaded sections with the same nominal major diameter and mate with the threads in threaded holes 141. The major diameter of the threaded sections of bolts 143 is measured at the crests of the threads. The major diameter of each bolt 143 is substantially the same but slightly smaller than diameter 135 of smaller bolt hole 133, so that either bolt 143 will pass closely through smaller bolt hole 133. The major diameter of each bolt 143 is significantly smaller than diameter 131 of larger bolt hole 129. The slight difference between the major diameter of each bolt 143 threaded section and smaller bolt hole diameter 135 is much less than the difference between the major diameter of each bolt 143 threaded section and larger bolt hole diameter 131.

Each bolt 143 has a head 144 with drive flats or surfaces for receiving a drive tool or wrench. The drive flats on head may be external or located within a cavity in head 144. Lock washers 145 are typically employed with bolts 143. Lock washers 145 may be the same size in dimensions. The outer diameter of each lock washer 145 is greater than diameter 131 of larger bolt hole 129. The inner diameter of each lock washer 145 is smaller than the circumscribed diameter of head 144.

The nominal distance between bolt hole axes 132, 136 is the same as the nominal distance between threaded hole axes 142, plus or minus tolerances. Ideally, when pothead connector 22 is secured on receptacle surface 137, axes 132 and 136 will coincide with axes 142, and axis 138 will coincide with axis 140. However, due to the manufacturing tolerances, the distance between axes 132, 136 of pothead housing 31 may not be precisely the same as the distance between receptacle threaded hole axes 142, or other misalignments may occur. That is, the distances between axes 132, 136 and between axes 142 may be substantially the same, but one of the threaded holes 141 may otherwise out of alignment with the axis 132, 136 of its mating bolt hole 129, 133. FIG. 5 illustrates in an exaggerated manner a greater distance between axes 142 than between axis 132 and 136. The larger diameter bolt hole 129 serves to accommodate this difference. Cavity axis 138 may also be slightly misaligned with central bore axis 140.

When installing pothead connector 22, as shown in FIG. 5, one of the bolts 143 may be first inserted through smaller bolt hole 133 or alternately first through larger bolt hole 129. The bolt 143 inserted through smaller bolt hole 133 must have its axis precisely aligned with axis 136 of smaller bolt hole 133. The bolt 143 inserted into smaller bolt hole 133 must have its axis coinciding with axis 142 of one of the threaded holes 141 in order to begin screwing into the threads of threaded hole 141. FIG. 5 shows smaller bolt hole axis 136 coinciding with the axis 142 of its mating threaded hole 141. Because diameter 135 of smaller bolt hole 133 is nearly the same as the major diameter of the threaded section of bolt 143 and threaded hole 141, coaxial alignment must occur in order to engage the threads of the bolt 143 within smaller bolt hole 133 with threaded hole 141.

The greater diameter 131 of larger bolt hole 129 allows the axis of bolt 143 to be misaligned or offset slightly with larger bolt hole axis 132 and still be coaxial with one of the threaded hole axis 142, as illustrated in FIG. 5. Consequently the bolt 143 in larger bolt hole 129 can engage the threads of threaded hole 141 and still be misaligned with larger bolt hole axis 132. If bolt 143 of larger bolt hole 129 is placed in threaded engagement with one of the threaded holes 141 before bolt 143 of smaller bolt hole 133, some slight sliding movement of pothead housing 31 may occur while the operator aligns axis 136 of smaller bolt hole 133 with axis 142. Once both bolts 143 have been made band tight, they may be torqued into threaded holes 141 to specifications. A slight difference between cavity axes 138 and central bore axis 140 due to tolerances may be accommodated by the resiliency of seal 125 (FIG. 3).

In one example, diameter 131 of larger diameter bolt hole 129 is nominally 0.438 inch. Diameter 135 of smaller diameter bolt hole 133 is nominally 0.375 inch, which is about 85% of diameter 131. Both threaded holes 141 have diameters of nominally 0.375 inch. The major diameter of each bolt 143 is nominally 0.375 inch. The spacing between axes 132, 136 of pothead housing 31 is nominally 2.750 inch. In this example, the tolerances for the holes 129, 133, 141 and the spacing between axes 132, 136 are plus or minus 0.003 inch from the nominal dimension. The difference between the larger diameter bolt hole 129 and the smaller diameter bolt hole 133 accommodates a maximum variation within the tolerances. The difference in nominal diameters 131, 135 may vary, but preferably diameter 135 is in a range from about 80% to 90% of diameter 131.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. A submersible well pump assembly, comprising:
a pump;
an electrical motor operatively connected with the pump for driving the pump;
an electrical receptacle on the motor that has a base into which a central bore and first and second threaded holes on opposite sides of the bore extend, the first and second threaded holes having major diameters that are nominally the same;
a motor lead extending to the motor and having an electrical connector on an end of the motor lead that mates with the receptacle, the electrical connector having a plurality of electrical conductors, each having a motor lead terminal for electrically connecting with a mating motor terminal in the motor;
the electrical connector having a flange containing cylindrical first and second bolt holes, the first bolt hole having a larger diameter than a diameter of the second bolt hole and also larger than the major diameters of the first and second threaded holes;
the second bolt having a diameter that is nominally the same as the major diameters of the first and second threaded holes; and
a pair of bolts, one extending through the first bolt hole into the first threaded hole and the other extending through the second bolt hole into the second threaded hole to secure the electrical connector to the electrical receptacle.

2. The assembly according to claim 1, wherein the bolts have threaded sections with major diameters that are nominally the same.

3. The assembly according to claim 1, wherein:
the diameter of the second bolt hole is in the range from 80 to 90 percent the diameter of the first bolt hole.

4. The assembly according to claim 1, wherein:
each of the bolt holes has an axis;
each of the threaded holes has an axis;
the electrical connector has a connector axis;
the central bore has a bore axis;
a nominal distance plus or minus a selected tolerance between the axes of the bolt holes is the same as a nominal distance plus or minus a selected tolerance between the axes of the threaded holes; and
in the event the tolerances cause an actual distance between the axes of the bolt holes to differ from an actual distance between the axes of the threaded holes, the connector axis will be parallel to and offset from the bore axis.

5. The assembly according to claim 1, wherein:
each of the bolt holes has an axis;
each of the threaded holes has an axis;

a nominal distance plus or minus a selected tolerance between the axes of the bolt holes is the same as a nominal distance plus or minus a selected tolerance between the axes of the threaded holes; and in the event the tolerances cause an actual distance between the axes of the bolt holes to differ from an actual distance between the axes of the threaded holes, the bolt within the first bolt hole will be off center from the axis of the first bolt hole.

6. A submersible well pump assembly, comprising:
a pump;
an electrical motor operatively connected with the pump for driving the pump;
an electrical receptacle on the motor that has a base into which a central bore and first and second threaded holes on opposite sides of the bore extend, the threaded holes having nominal major diameters that are the same;
a motor lead extending to the motor and having an electrical connector on an end of the motor lead that mates with the receptacle, the electrical connector having a plurality of electrical conductors, each having a motor lead terminal for electrically connecting with a mating motor terminal in the motor;
the electrical connector having a flange containing first and second bolt holes of circular cross section, the second bolt hole having a nominal diameter the same as the nominal major diameter of the first and second threaded holes, the first bolt hole having a nominal diameter that is larger than the nominal diameter of the second bolt hole and also larger than the nominal major diameters of the first and second threaded holes;
a first bolt extending through the first bolt hole into threaded engagement with the first threaded hole;
a second bolt extending through the second bolt hole into the second threaded hole to secure the electrical connector to the electrical receptacle; and wherein
the first and second bolts have threaded sections with nominal major diameters that are the same.

7. The assembly according to claim 6, wherein:
the diameter of the second bolt hole is in the range from 80 to 90 percent of the diameter of the first bolt hole.

8. The assembly according to claim 6, wherein:
each of the bolt holes has an axis;
each of the threaded holes has an axis;
the electrical connector has a connector axis;
the central bore has a bore axis;
a nominal distance plus or minus a selected tolerance between the axes of the bolt holes is the same as a nominal distance plus or minus a selected tolerance between the axes of the threaded holes; and
in the event the tolerances cause an actual distance between the axes of the bolt holes to differ from an actual distance between the axes of the threaded holes, the connector axis will be parallel to and offset from the bore axis.

9. The assembly according to claim 6, wherein:
each of the bolt holes has an axis;
each of the threaded holes has an axis;
a nominal distance plus or minus a selected tolerance between the axes of the bolt holes is the same as a nominal distance plus or minus a selected tolerance between the axes of the threaded holes; and
in the event the tolerances cause an actual distance between the axes of the bolt holes to differ from an actual distance between the axes of the threaded holes, the first bolt will be off center from the axis of the first bolt hole.

10. A submersible well pump assembly, comprising:
a pump;
an electrical motor operatively connected with the pump for driving the pump;
an electrical receptacle on the motor that has a base into which a central bore and first and second threaded holes on opposite sides of the bore extend, the threaded holes having major diameters that are nominally the same;
a motor lead extending to the motor and having an electrical connector on an end of the motor lead that mates with the receptacle, the electrical connector having a plurality of electrical conductors, each having a motor lead terminal for electrically connecting with a mating motor terminal in the motor;
the electrical connector having a flange containing first and second bolt holes of circular cross section, the second bolt hole having a nominal diameter the same as the major diameters of the first and second threaded holes, the first bolt hole having a diameter that is larger than the diameter of the second bolt hole and also larger than the major diameters of the first and second threaded holes;
a first bolt extending through the first bolt hole and having a threaded section in threaded engagement with the first threaded hole, the threaded section of the first bolt being smaller in major diameter than the diameter of the first bolt hole; and
a second bolt extending through the second bolt hole and having a threaded section in threaded engagement with the second threaded hole, the threaded section of the second bolt having a major diameter that is nominally the same as the major diameter of the threaded section of the first bolt, the major diameter of the threaded section of the second bolt being the same as the diameter of the second bolt hole.

11. The assembly according to claim 10, wherein:
the diameter of the second bolt hole is in the range from 80 to 90 percent of the diameter of the first bolt hole.

12. The assembly according to claim 10, wherein:
each of the bolt holes has an axis;
each of the threaded holes has an axis;
the electrical connector has a connector axis;
the central bore has a bore axis;
a nominal distance plus or minus a selected tolerance between the axes of the bolt holes is the same as a nominal distance plus or minus a selected tolerance between the axes of the threaded holes; and
in the event the tolerances cause an actual distance between the axes of the bolt holes to differ from an actual distance between the axes of the threaded holes, the connector axis will be parallel to and offset from the bore axis.

13. The assembly according to claim 10, wherein:
each of the bolt holes has an axis;
each of the threaded holes has an axis;
a nominal distance plus or minus a selected tolerance between the axes of the bolt holes is the same as a nominal distance plus or minus a selected tolerance between the axes of the threaded holes; and
in the event the tolerances cause an actual distance between the axes of the bolt holes to differ from an actual distance between the axes of the threaded holes, the first bolt will be off center from the axis of the first bolt hole.

* * * * *

UNITED STATES PATENT AND TRADEMARK OFFICE
CERTIFICATE OF CORRECTION

PATENT NO. : 9,935,518 B2
APPLICATION NO. : 14/825247
DATED : April 3, 2018
INVENTOR(S) : Spencer L. Wilcox It is certified that error appears in the above-identified patent and that said Letters Patent is hereby corrected as shown below:

In the Specification

Column 1, Line 16, "torn" should be --from--
Column 2, Line 27, "bolt, holes" should be --bolt holes--
Column 3, Line 31, "22. Thereby" should be --22, thereby--
Column 4, Line 18, "retain. The" should be --retain the--
Column 5, Line 21, "may" should be --may be--
Column 5, Line 24, "axis 132" should be --axes 132--
Column 5, Line 46, "axis 142" should be --axes 142--

Signed and Sealed this
Twenty-fourth Day of July, 2018

Andrei Iancu
*Director of the United States Patent and Trademark Office*